US010114878B2

(12) United States Patent
Bhide et al.

(10) Patent No.: US 10,114,878 B2
(45) Date of Patent: Oct. 30, 2018

(54) INDEX UTILIZATION IN ETL TOOLS

(71) Applicant: International Business Machines Corporation, Armonk, NY (US)

(72) Inventors: Manish A. Bhide, Hyderabad (IN); Jean-Claude Mamou, Millbury, MA (US); Shyam R. Mudambi, Wayland, MA (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 14/108,067

(22) Filed: Dec. 16, 2013

(65) Prior Publication Data
US 2015/0169712 A1 Jun. 18, 2015

(51) Int. Cl.
*G06F 17/30* (2006.01)
(52) U.S. Cl.
CPC .............. *G06F 17/30563* (2013.01)
(58) Field of Classification Search
CPC ................................ G06F 17/30563
USPC .................................. 707/600, 602
See application file for complete search history.

(56) References Cited

U.S. PATENT DOCUMENTS

| 7,024,431 | B1 | 4/2006 | Kornelson et al. |
| 7,139,779 | B1 | 11/2006 | Kornelson et al. |
| 7,461,262 | B1* | 12/2008 | O'Toole, Jr. ........ G06F 21/6218 380/255 |
| 7,640,262 | B1* | 12/2009 | Beaverson ........ G06F 17/30327 |
| 7,849,049 | B2 | 12/2010 | Langseth et al. |
| 7,984,019 | B2 | 7/2011 | Boyko et al. |
| 8,433,673 | B2 | 4/2013 | Venkatasubramanian et al. |
| 8,442,935 | B2 | 5/2013 | Cottle et al. |
| 9,189,408 | B1* | 11/2015 | Douglis .................... G06F 3/06 |
| 2006/0117146 | A1* | 6/2006 | Clisby .................. G06F 12/084 711/141 |
| 2007/0078909 | A1* | 4/2007 | Tamatsu ............ G06F 17/30315 |
| 2008/0114939 | A1* | 5/2008 | Mouton .............. G06F 12/0895 711/128 |
| 2009/0307686 | A1* | 12/2009 | Hepkin ............... G06F 9/45558 718/1 |

(Continued)

OTHER PUBLICATIONS

Jorg, T. and Dessloch, S. "Formalizing ETL Jobs for Incremental Loading of Data Warehouses". pp. 327-346. <http://subs.emis.de/LNI/Proceedings/Proceedings144/332.pdf>.

(Continued)

*Primary Examiner* — James Trujillo
*Assistant Examiner* — Fariborz Khoshnoodi
(74) *Attorney, Agent, or Firm* — Tihon Poltavets

(57) ABSTRACT

A computer manages methods for utilizing an index to manage access to data in a dataset stored in one or more file locations in an ETL tool by receiving a request to access a dataset associated with one or more file locations, wherein the dataset is stored in the one or more file locations. The computer queries an index for the one or more file locations associated with the dataset, wherein the dataset has another index for data in the dataset. The computer receives the one or more file locations associated with the dataset. The computer determines to cache the request to access the one or more file locations for the dataset until one or more thresholds are met, wherein the cached request is part of a total number of cached requests.

12 Claims, 4 Drawing Sheets

(56) References Cited

U.S. PATENT DOCUMENTS

2011/0161333 A1 6/2011 Langseth et al.
2013/0151491 A1* 6/2013 Gislason ........... G06F 17/30339
707/696

OTHER PUBLICATIONS

Reddy V.M. and Jena S.K. "Active Datawarehouse Loading by Tool Based ETL Procedure". International Conference on Information and Knowledge Engineering, 2010 (IKE '10). pp. 196-201. <http://dspace.nitrkl.ac.in/dspace/bitstream/2080/1274/1/IKE4501.pdf>.
"Surrogate Key Generator stage". IBM InfoSphere DataStage and InfoSphere QualityStage, Version 8.5. Last updated: Oct. 8, 2012.

* cited by examiner

INDEX UTILIZATION IN ETL TOOLS

FIELD OF THE INVENTION

The present invention relates generally to indexing datasets, and more particularly, to utilizing indices to manage requests for datasets.

BACKGROUND

Extract Transform Load (ETL) refers to a process in database usage, more specifically in data warehousing, performed by an ETL tool. The process includes extracting data from an outside source, transforming the data to fit operational needs, and loading the transformed data into an end target (e.g., database or database warehouse). Typically, ETL tools read data from source systems, such as a database, transform the data, and store frequently used data in what is called a dataset. An ETL process typically consists of numerous ETL jobs which the ETL tool sequences together. A dataset is typically created by one of the ETL jobs and is used by the rest of the jobs in the sequence. In certain instances, where a particular dataset was already transformed, additional ETL jobs may still request the particular dataset. It is not uncommon for the dataset to be large, usually consisting of gigabytes (GB) of data. In order for the ETL tool to obtain a particular data element in a dataset, the ETL tool would typically have to sort through an extensive quantity of data to locate the particular data in the dataset. Sorting through the dataset to locate the data can be time consuming and delay any additionally received requests for datasets.

Reading data from a large dataset can be similarly inefficient if the particular dataset is needed for multiple ETL jobs. For example, there may be instances where the ETL tool requests a particular dataset multiple times and the ETL tool has to scan through the data in the dataset multiple times. Furthermore, datasets are typically partitioned when they are stored, where a single dataset can be stored in multiple file locations. The ETL tool has to access all the multiple file locations to obtain the partitioned dataset and the ETL tool performs this every time the partitioned dataset is requested for an ETL process.

SUMMARY

Embodiments of the present invention disclose a method, computer program product and computer system for utilizing an index to manage access to data in a dataset stored in one or more file locations in an ETL tool. A computer receives, by one or more processors, a request to access a dataset associated with one or more file locations, wherein the dataset is stored in the one or more file locations. The computer queries, by one or more processors, an index for the one or more file locations associated with the dataset, wherein the dataset has another index for data in the dataset. The computer receives, by one or more processors, the one or more file locations associated with the dataset. The computer determines, by one or more processors, to cache the request to access the one or more file locations for the dataset until one or more thresholds are met, wherein the cached request is part of a total number of cached requests.

DETAILED DESCRIPTION

Figure 1:
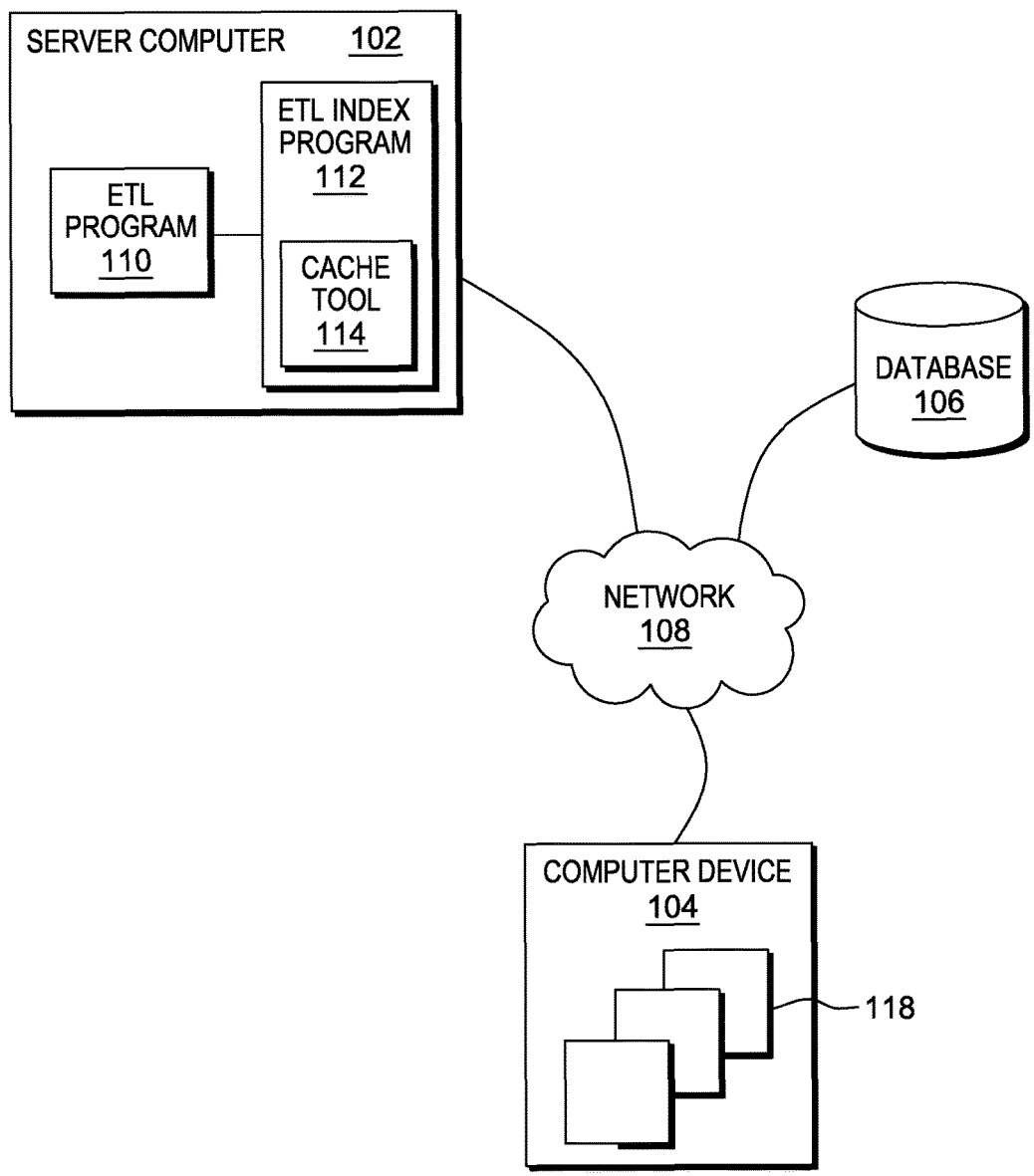
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, in accordance with one embodiment of the present invention. Distributed data processing environment includes server computer 102, computer device 104, and database 106 interconnected over network 108.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Extract Transform Load (ETL) program 110 residing in server computer 102 has the ability to read and create datasets 118. ETL program 110 can transform dataset 118 and load the transformed dataset 118 into a designated storage location, such as, database 106, a file system, or another dataset. ETL program 110 may be a server based program. ETL program 110 may comprise programs or tools such as ETL index program 112 and cache tool 114. In this embodiment, ETL program 110 communicates with ETL index program 112 and cache tool 114 residing on server computer 102.

ETL index program 112 has the ability to create and maintain indices for datasets (i.e., dataset 118). In this embodiment, ETL index program 112 can identify key values for the data in the dataset. Based on the usage of the data in further ETL processes, ETL index program 110 can identify the keys to be used for creating the index and use the identified key values to create an index for the data and store the index along with the dataset. Subsequently, ETL index program 112 can index the dataset with the file location for the dataset. ETL index program 112 can determine a file location as well as an offset within the file where ETL program 110 is to store the transformed data in the dataset and store the file location and offset with the data in the index.

In this embodiment, cache tool 114 is a function of ETL index program 112 and has the ability to consolidate multiple input/out (I/O) requests for data in the datasets. Cache tool 114, of ETL index program 112, can handle requests for data in the datasets which the ETL program 110 receives. Cache tool 114 caches the requests for data in the datasets listed in the index that ETL index program 112 maintains. Cache tool 114 caches the requests for the dataset until one or more thresholds are met so that ETL program 110 can perform a single I/O operation for the multiple I/O request.

In general, network 108 can be any combination of connections and protocols that will support communications between server computer 102, computer device 104 and database 106. Network 108 can include, for example, a local area network (LAN), a wide area network (WAN) such as the internet, a cellular network, or any combination of the preceding, and can further include wired, wireless, and/or fiber optic connections.

In one embodiment, ETL program 110 and ETL index program 112 may be a web service accessible via network 108 to a user of a separate device, e.g., computer device 104. In another embodiment, ETL program 110 and ETL index program 112 may be operated directly by a user of server computer 102.

In various embodiments of the present invention, computer device 104 can be a laptop computer, a tablet computer, a netbook computer, a personal computer (PC), a desktop computer, a personal digital assistant (PDA), a smartphone, or any programmable electronic device capable of communicating with server computer 102 and database 106 via network 108.

Database 106 can store content of ETL index program 112 such as, file systems containing indices, key value entries for each index, and file locations for each key value entry of each index. Database 106 can also store any datasets for which ETL index program 112 creates and maintains an index. Database 106 can also be located on server computer 102, computer device 104, or any other location in distributed data processing environment connected to network 108.

Figure 2:
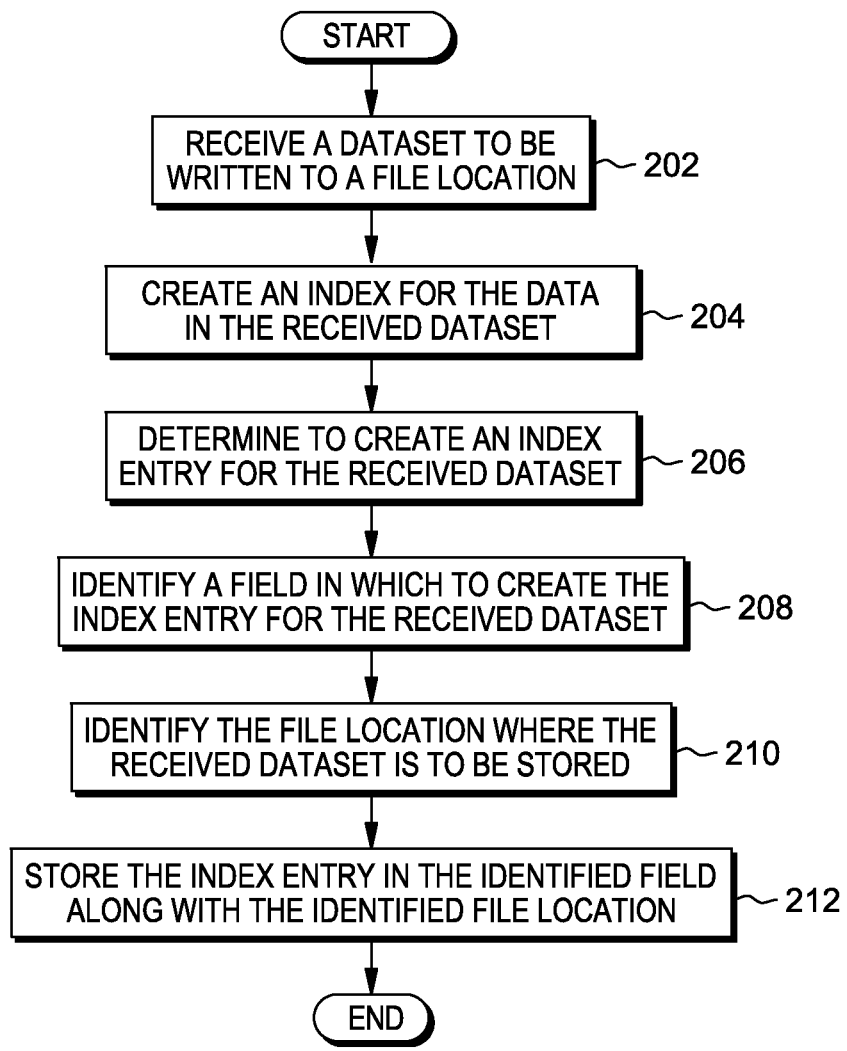
FIG. 2 is a flowchart depicting operational steps of an ETL index program for maintaining an index for dataset, in accordance with an embodiment of the present invention.

FIG. 2 is a flowchart depicting operational steps of an ETL index program for creating an index for datasets stored in a file system, in accordance with an embodiment of the present invention.

ETL index program 112 receives a dataset to be written to a file location (step 202). Subsequent to transforming the data in the ETL process, ETL program 110 writes the dataset to a file location. ETL index program 112 maintains an index for all the file locations along with the associated data in each of the file locations. In one embodiment, ETL index program 112 receives a dataset which ETL program 110 is to parse into multiple locations in the file system. ETL indexing program 112 has the ability to identify each partition of the dataset and the associated file location for each partition of the received dataset. ETL index program 112 also has the ability to provide an offset for the data in each partition of the dataset.

ETL index program 112 creates an index for the data while creating the dataset (step 204). The dataset contains data that is typically utilized in other ETL processes that ETL program 110 may perform. ETL index program 112 can determine particular keys of the data which ETL program 110 can use when requesting particular data from the dataset for the other ETL processes. ETL index program 112 can create an index based on the determined keys and store the index for the data along with the dataset. ETL index program 112 can store the index for the data in the form of metadata associated with the dataset. Such an index allows for ETL index program 112 to identify where particular data can be located for subsequent ETL processes.

For example, ETL program 110 creates a dataset with data containing a list of customer identification numbers (e.g., ID#1234) and a transaction total (e.g., $34,000) for each of the customer identification numbers in the list. ETL index program 112 can determine the key for the data to be the customer identification numbers and ETL index program 112 can create an index containing the customer identification numbers for the data in the dataset. ETL index program 112 can store the index defined using the customer identification numbers along with the dataset. ETL index program 112 can utilize the index for other ETL processes, for example, identifying if a particular customer identification number and associated transaction total is present in the dataset.

In another example, ETL program 110 receives data containing a list of employees' names and employee information (e.g., date of birth, salary amounts, expertise level). ETL index program 112 can determine the key for the data to be the employee names and ETL index program 112 can create an index containing the employee names for the data in the dataset. ETL index program 112 can store the index with the employee names along with the dataset. ETL index program 112 can utilize the index for other ETL processes, for example, identifying if a particular employee and associated employee information is present in the dataset.

ETL index program 112 creates an index entry for the received data (step 204). ETL index program 112 maintains an index for the datasets which ETL program 110 handles. In one embodiment, ETL index program 112 can contain a user preference feature, where the user can specify if ETL index program 112 is to create the index entry for the received dataset. In one embodiment, ETL index program 112 identifies existing entries in the index, ETL index program 112 updates the existing entries in the index according to the received dataset. In this embodiment, ETL index program 112 identifies no existing entries in the index for the received dataset.

ETL index program 112 identifies a field in which to create the index entry for the received dataset (step 206). In one embodiment, the field can be identified using a particular ETL process of ETL program 110. For example, ETL program 110 is performing the particular ETL process, where the particular ETL process transforms data from multiple sources. ETL index program 112 can determine to group the entries for the multiple datasets of the particular ETL process in a single field in the index. Grouping the multiple datasets in the single field in the index allows for ETL index program 112 to identify file locations for the multiple datasets, if ETL program 110 requests the multiple datasets corresponding to the particular ETL process.

In another embodiment, the ETL index program 112 is capable of receiving a user preference specifying whether or not to identify one field for the partitioned dataset or to identify multiple fields for the partitioned dataset.

ETL index program 112 identifies the field where the received dataset is to be stored (step 208). In one embodiment, ETL index program 112 receives the dataset along with associated metadata specifying a file location where the received dataset is to be stored. The file location directs ETL program 110 when requesting the dataset. In another embodiment, where the dataset is partitioned, ETL index program 112 identifies multiple file locations where the received dataset is to be stored (step 210). ETL index program 112 compiles the multiple file locations and provides a sequential order for the multiple file locations representing the partitioned dataset. The file location, for example, may represent a pointer to the page number (i.e., disk storage) in the file along with an offset in the page (i.e., disk location) where the dataset is stored.

ETL index program 112 stores the index entry of the identified field along with the identified file location (step 212). In one embodiment, ETL index program 112 can store the index entry in the form of a B+ Tree index. For example, the index entry can contain the key value for the dataset, where ETL index program 112 can utilize the key value when identifying whether or not a data entry exists in an index. ETL index program 112 can utilize a pointer in the B+ Tree index, where the pointer specifies the file location for a particular dataset. In case of instances where the dataset is stored in multiple file locations, ETL index program 112 stores the index entry for each of the multiple locations associated with the dataset. In one embodiment, ETL index program 112 can also store a single index entry for the dataset, where the dataset has the multiple file locations in the single index entry.

Figure 3:
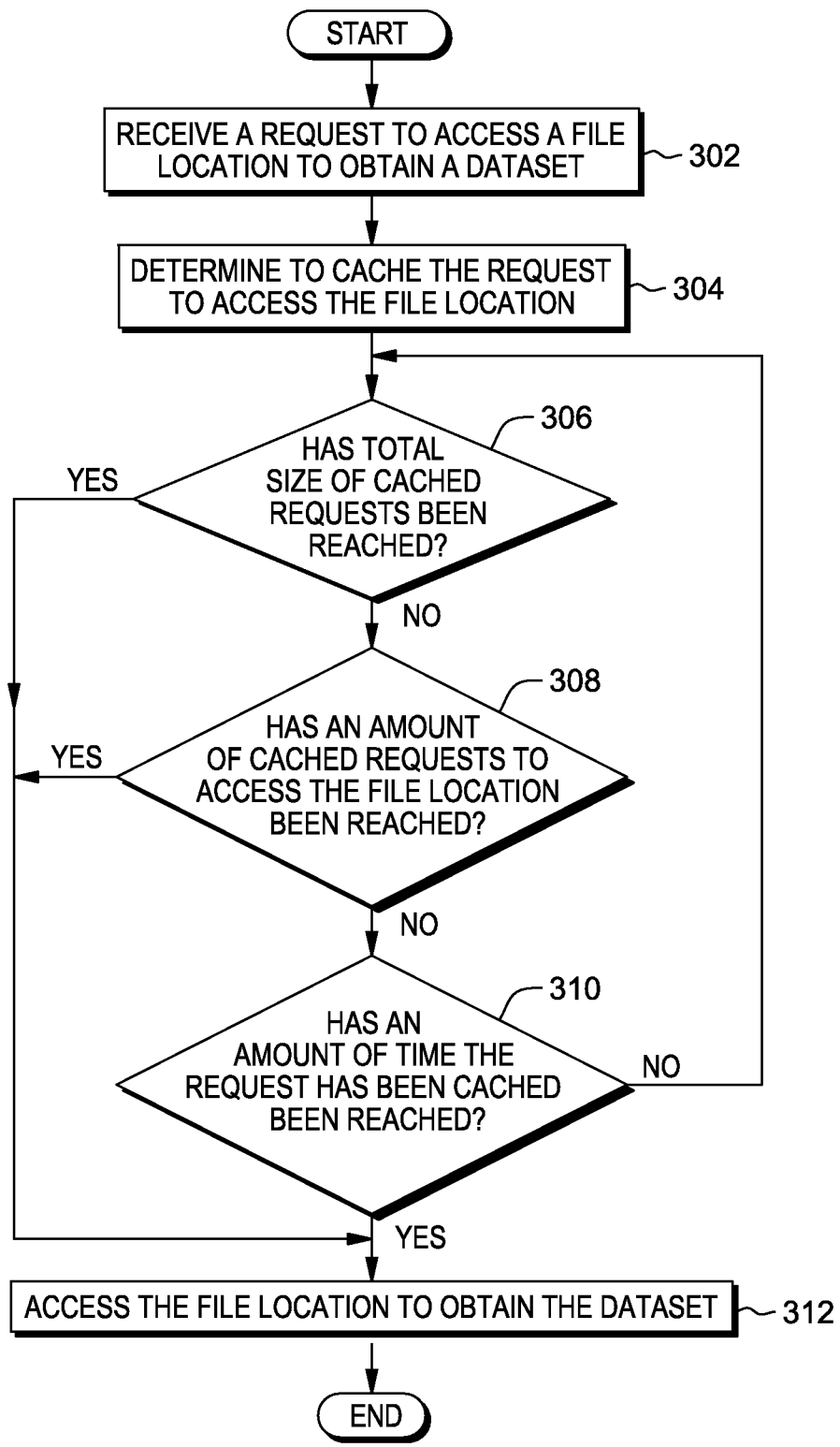
FIG. 3 is a flowchart depicting operational steps of an ETL index program utilizing a caching tool for managing requests for datasets, in accordance with an embodiment of the present invention.

FIG. 3 is a flowchart depicting operational steps of an ETL index program utilizing a cache tool for managing requests for datasets, in accordance with an embodiment of the present invention.

In this embodiment, ETL index program 112 contains cache tool 114 capable of handling requests (i.e., I/O) for accessing data stored in a dataset present in multiple file locations. For discussion purposes, ETL index program 112 utilizes cache tool 114 to perform the operational steps of handing requests. ETL index program 112 receives a request to access a file location to obtain data for the ETL program 110. ETL index program 112 may cache the request until one or more thresholds are met. Once the one or more threshold are met, ETL index program 112 accesses the file location for the dataset, satisfying the received request to access the dataset and any other cached requests to access the same file location.

ETL index program 112 receives a request to access a file location to obtain a dataset (step 302). In one embodiment, ETL index program 112 continuously receives requests to access file locations to obtain data from a dataset for an ETL program 110, as ETL program 110 performs an ETL process. ETL index program 112 is capable of receiving a user preference specifying that ETL index program 112 is to accept every request to access a file location and allow for the querying of the index to identify the file location associated with the dataset. ETL index program 112 is also capable of receiving a user preference specifying that ETL index program 112 is to reject certain requests to access a particular file location in the file system and not allow for the querying of the index to identify the file location associated with the dataset. ETL index program 112 can also reject certain requests to access a file location for a dataset if an order is assigned to the request, where ETL index program 112 caching the request can disrupt the order assigned to the request to access the file location for the dataset.

ETL index program 112 determines to cache the request to access the file location (step 304). In one embodiment, ETL index program 112 determines to cache the request to access the location based on the number of requests ETL index program 112 receives. During low I/O requests, ETL index program 112 can determine to bypass caching the request and instead perform the request to access the location for the dataset. In this embodiment, ETL index program 112 determines there is a high number of I/O request for various datasets. ETL index program 112 can determine if there are a high number of I/O requests based on the number of requests being received during a particular duration. For example, the number of I/O requests ETL index program 112 receives per minute.

ETL index program 112 determines if a total size of cached requests has been reached (decision 306). In one embodiment, ETL index program 112 determines a threshold for the total size of cached requests has not been reached ("no" branch, decision 306), ETL index program 112 proceeds in determining whether or not other thresholds have been reached. If ETL index program 112 determines the threshold for the total size of cached requests has been reached ("yes" branch, decision 306), ETL index program 112 proceeds to access the file location to obtain the dataset in step 312.

In one embodiment, the threshold for the total size of cached requests is based on the total number of cached requests that ETL index program 112 has received. ETL index program 112 is capable of receiving a user input specifying the total number of cached requests upon which the threshold is based. In another embodiment, the threshold for the total size of cached requests is based on an amount of temporary storage on server computer 102 that ETL index program 112 can allocate to cache the received requests. ETL index program 112 is capable of identifying whether or not the temporary storage location on server computer 102 is approaching maximum capacity. If the maximum capacity of the temporary storage location has been reached, ETL index program 112 determines the threshold for the total size of cached requests has been reached ("yes" branch, decision 306).

ETL index program 112 has the ability of decreasing the total size of cached requests once ETL index program 112 determines the threshold has been reached. In one embodiment, ETL index program 112 is capable of receiving a user input specifying how much of the total size of cached requests is to be reduced. For example, upon determining the threshold has been reached, ETL index program 112 can reduce the total size of the cached requests by 10%. ETL index program 112 reduces the total size of the cached requests by identifying the cached requests which are to be accessed in step 312. To reduce the total size of cached requests by 10%, ETL index program 112 can identify which file locations have the greatest number of cached requests for datasets. The file locations ETL index program 112 identifies as having the greatest number of cached requests for datasets are the file locations ETL index program 112 accesses in step 312.

ETL index program 112 determines if an amount of cached requests to access the file location has been reached (decision 308). In one embodiment, ETL index program 112 determines a threshold of cached requests to access the file location has not been reached ("no" branch, decision 308), ETL index program 112 proceeds in determining whether or not other thresholds have been reached. If ETL index program 112 determines the threshold for the number of cached requests to access the file location has been reached ("yes" branch, decision 308), ETL index program 112 proceeds to access the file location to obtain the dataset in step 312.

In one embodiment, the threshold is the number of cached requests for a particular file location. Since there are instances where multiple datasets are associated with the particular file location, ETL index program 112 caches all the requests for the datasets associated with the particular file location until the number of requests reaches the threshold amount. ETL index program 112 has the ability to keep a count of the number of dataset requests for each of the file locations. ETL index program 112 can have a different cached request threshold value for each of the file locations. For example, a file location that receives more requests for associated datasets may have a higher threshold to limit the amount of time ETL index program 112 accesses the file location to satisfy the cached requests for the associated datasets.

ETL index program 112 determines if an amount of time the request has been cached is reached (decision 310). In one embodiment, ETL index program 112 determines a threshold for the amount of time the request has been cached has not been reached ("no" branch, decision 310), ETL index program 112 reverts back to step 306 and proceeds to determine whether the total size of cached requests has been reached. If ETL index program 112 determines the threshold for the amount of time the request has been cached has been reached ("yes" branch, decision 310), ETL index program 112 proceeds to access the file location to obtain the dataset in step 312.

In one embodiment, ETL index program 112 can measure the duration a particular request for a dataset that has been cached. Such a threshold can represent a staleness of the particular request. In one example, ETL index program 112 can have a duration threshold for each file location if the particular request for the dataset has been cached. ETL index program 112 is capable of receiving a user input specifying the duration threshold for each file location. A first file location containing associated datasets can have a duration threshold that is 0.5 seconds while a second file location containing other associated datasets can have a duration threshold that is 1.0 seconds.

In another embodiment, ETL index program 112 measures the number of file locations accessed during the caching of a request for a particular file location. Additionally, ETL index program 112 can utilize the measure to determine if a cached request for a dataset has been cached for too long. For example, ETL index program 112 can use the duration threshold to determine when a particular request for a dataset has been received. ETL index program 112 can measure the number of file locations accessed and determine whether or not the request for the particular dataset has been cached for too long.

ETL index program 112 accesses the file location to obtain the dataset (step 312). In one embodiment, the dataset can be associated with one or more file locations where there is a large dataset parsed into multiple file locations. ETL index program 112 utilizing the index for the dataset can identify the one or more file locations where the dataset is parsed. In this embodiment, there is one file location associated with the dataset. In this embodiment, ETL index program 112 accesses the file location to obtain the dataset and satisfy any other request for datasets which may have been requested in the file location.

Figure 4:
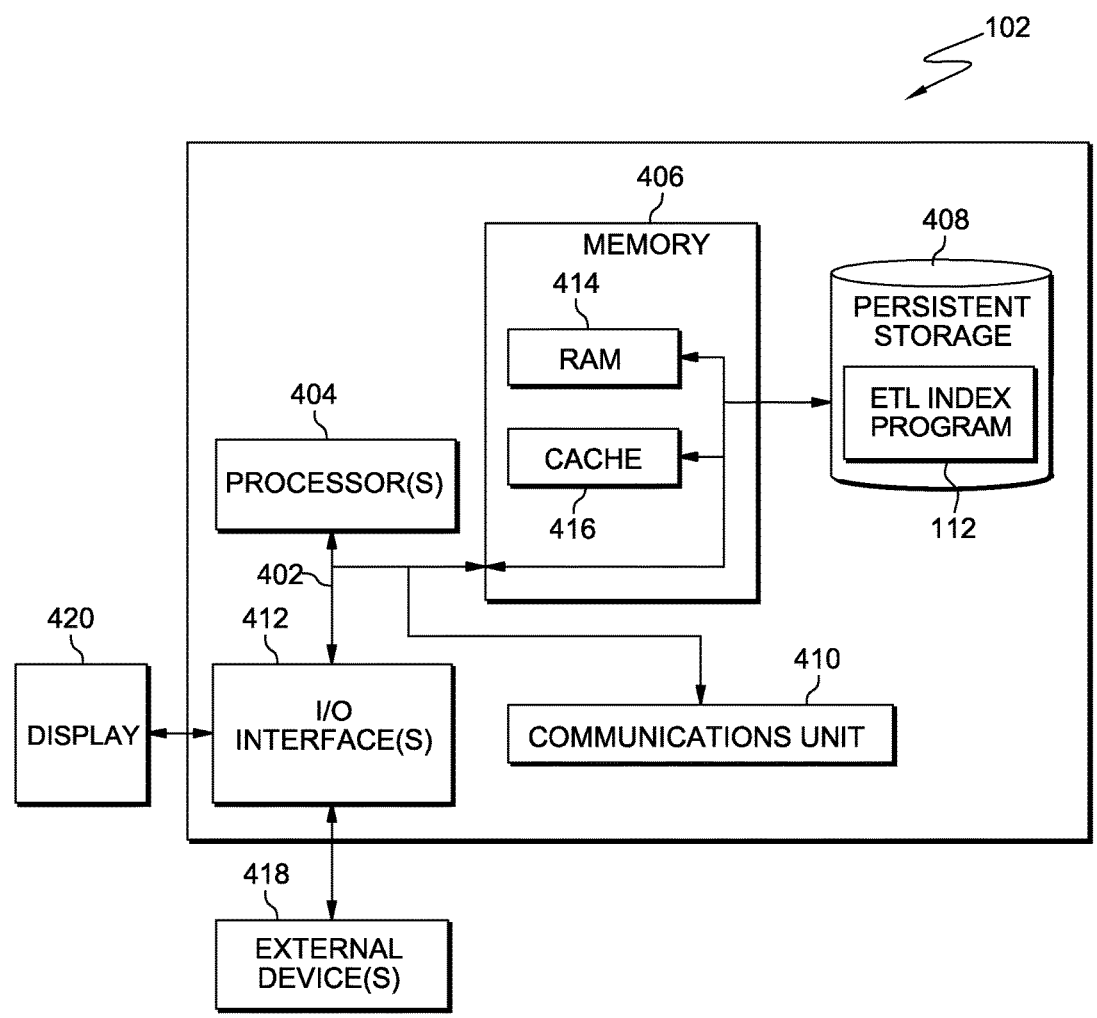
FIG. 4 is a block diagram of components of a computer system, such as the computer server of FIG. 1, in accordance with an embodiment of the present invention.

FIG. 4 depicts a block diagram of components of a computer, such as server computer 102, operating ETL index program 112 within the distributed data processing environment, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer-readable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer-readable storage device.

ETL index program 112 is stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as ETL index program 112, may be downloaded to persistent storage 408 through communications unit 410, or uploaded to another system through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for utilizing an index to manage access to data in a dataset stored in one or more file locations in an Extract Transform Load tool, the method comprising:
    receiving, by one or more processors, a request to access a first dataset of a plurality of datasets stored at a source system during an Extract Transform Load process between the source system and an end target system during a period of high I/O requests, wherein the period of high I/O requests is based on a number of I/O requests received for a particular duration;
    querying, by one or more processors, a first index for one or more file locations where the first dataset is stored at the source system;
    responsive to determining that caching the request does not disrupt an order assigned to the request to access the first dataset of the plurality of datasets stored at the source system, caching, by one or more processors, the request to access the first dataset stored at the source system, wherein the cached access request for the first dataset is one of a plurality of cached requests to access the plurality of datasets stored in a plurality of file locations at the source system;
responsive to determining a total size of the plurality of cached requests in temporary storage does not met a first threshold level, determining, by one or more processors, whether a duration for which the cached request for the first dataset of the plurality of cached requests has been cached in the temporary storage has met a second threshold level;
responsive to determining that the duration for which the cached request for the first dataset of the plurality of cached requests has been cached has met the second threshold, identifying, by one or more processors, a first file location of the plurality of file locations to access in order to satisfy a portion of the plurality of cached requests for datasets that includes the cached request to access the first dataset; and
accessing, by one or more processors, the first file location at the source system to satisfy the portion of the plurality of cached requests for datasets that includes the cached request to access the first dataset stored at the first file location, wherein accessing the first file location to satisfy the portion of the plurality of cached requests for the datasets stored at the first file location reduces the total size of the plurality of cached requests to access the source system during the Extract Transform Load process.

2. The method of claim 1, further comprising:
prior to receiving a request to access a first dataset, receiving, by one or more processors, data which is to be stored in the first dataset, wherein the data includes employee date of birth, employee salary amount, and employee expertise level;
creating, by one or processors, a second index using one or more keys representing the data present in the received first dataset, wherein the one or more keys includes employee names; and
identifying, by one or more processors, each field of the second index to store one or more entries, wherein each entry is associated with one or more file locations along with an offset of the data to be stored in the first dataset in the one or more file locations.

3. A computer program product for utilizing an index to manage access to data in a dataset stored in one or more file locations in an Extract Transform Load tool, the computer program product comprising:
one or more computer readable storage media;
program instructions stored on the one or more computer readable storage media, which when executed by one or more processors, to:
receive a request to access a first dataset of a plurality of datasets stored at a source system during an Extract Transform Load process between the source system and an end target system during a period of high I/O requests, wherein the period of high I/O requests is based on a number of I/O requests received for a particular duration;
query a first index for one or more file locations where the first dataset is stored at the source system;
responsive to determining that caching the request does not disrupt an order assigned to the request to access the first dataset of the plurality of datasets stored at the source system, cache the request to access the first dataset stored at the source system, wherein the cached access request for the first dataset is one of a plurality of cached requests to access the plurality of datasets stored in a plurality of file locations at the source system;
responsive to determining a total size of the plurality of cached requests in temporary storage does not met a first threshold level, determine whether a duration for which the cached request for the first dataset of the plurality of cached requests has been cached in the temporary storage has met a second threshold level;
responsive to determining the duration for which the cached request for the first dataset of the plurality of cached requests has been cached has met the second threshold, identify a first file location of the plurality of file locations to access in order to satisfy a portion of the plurality of cached requests for datasets that includes the cached request to access the first dataset; and
access the first file location at the source system to satisfy the portion of the plurality of cached requests for datasets that includes the cached request to access the first data set stored at the first file location, wherein accessing the first file location to satisfy the portion of the plurality of cached requests for the datasets stored at the first file location reduces the total size of the plurality of cached requests to access the source system during the Extract Transform Load process.

4. The computer program product of claim 3, further comprising program instructions, stored on the one or more computer readable storage media, which when executed by a processor, to:
prior to receiving a request to access a first dataset, receive data which is to be stored in the first dataset, wherein the data includes employee date of birth, employee salary amount, and employee expertise level;
create a second index using one or more keys representing the data present in the received first dataset, wherein the one or more keys includes employee names; and
identify, by one or more processors, each field of the second index to store one or more entries, wherein each entry is associated with one or more file locations along with an offset of the data to be stored in the first dataset in the one or more file locations.

5. A computer system for utilizing an index to manage access to data in a dataset stored in one or more file locations in an ETL tool, the computer system comprising:
one or more computer processors;
one or more computer readable storage media;
program instructions stored on the one or more computer readable storage media, for execution by at least one of the one or more computer processors, which when executed, to:
receive a request to access a first dataset of a plurality of datasets stored at a source system during an Extract Transform Load process between the source system and an end target system during a period of high I/O requests, wherein the period of high I/O requests is based on a number of I/O requests received for a particular duration;
query a first index for one or more file locations where the first dataset is stored at the source system;
responsive to determining that caching the request does not disrupt an order assigned to the request to access the first dataset of the plurality of datasets stored at the source system, cache the request to access the first dataset stored at the source system, wherein the cached access request for the first dataset is one of a plurality of cached requests to access the plurality of datasets stored in a plurality of file locations at the source system;

responsive to determining a total size of the plurality of cached requests in temporary storage does not met a first threshold level, determine whether a duration for which the cached request for the first dataset of the plurality of cached requests has been cached in the temporary storage has met a second threshold level;

responsive to determining the duration for which the cached request for the first dataset of the plurality of cached requests has been cached has met the second threshold, identify a first file location of the plurality of file locations to access in order to satisfy a portion of the plurality of cached requests for datasets that includes the cached request to access the first dataset; and access the first file location at the source system to satisfy the portion of the plurality of cached requests for datasets that includes the cached request to access the first data set stored at the first file location, wherein accessing the first file location to satisfy the portion of the plurality of cached requests for the datasets stored at the first file location reduces the total size of the plurality of cached requests to access the source system during the Extract Transform Load process.

6. The computer system of claim 5, further comprising program instructions, stored on the one or more computer readable storage media, which when executed by a processor, to:

prior to receiving a request to access a first dataset, receive-data which is to be stored in the first dataset, wherein the data includes employee date of birth, employee salary amount, and employee expertise level;

create a second index using one or more keys representing the data present in the received first dataset, wherein the one or more keys includes employee names; and identify, by one or more processors, each field of the second index to store one or more entries, wherein each entry is associated with one or more file locations along with an offset of the data to be stored in the first dataset in the one or more file locations.

7. The method of claim 1, further comprising:

accessing, by one or more processors, a remaining plurality of file locations to satisfy the cached requests for datasets stored at the remaining plurality of file locations, wherein the cached requests for the datasets stored at the remaining plurality of file locations represent a remaining portion of the total size of the plurality of cached requests.

8. The computer program product of claim 3, further comprising program instructions, stored on the one or more computer readable storage media, which when executed by a processor, to:

access a remaining plurality of file locations to satisfy the cached requests for datasets stored at the remaining plurality of file locations, wherein the cached requests for the datasets stored at the remaining plurality of file locations represent a remaining portion of the total size of the plurality of cached requests.

9. The computer system of claim 5, further comprising program instructions, stored on the one or more computer readable storage media, which when executed by a processor, to:

access a remaining plurality of file locations to satisfy the cached requests for datasets stored at the remaining plurality of file locations, wherein the cached requests for the datasets stored at the remaining plurality of file locations represent a remaining portion of the total size of the plurality of cached requests.

10. The method of claim 2, further comprising:

storing, by one or more processors, the one or more entries of the second index in the one or more file locations as a B+ Tree index, wherein each pointer in the B+ Tree index specifies each of the one or more file locations for an existing data entry of the one or more entries.

11. The computer program product of claim 4, further comprising program instructions, stored on the one or more computer readable storage media, which when executed by a processor, to:

store the one or more entries of the second index in the one or more file locations as a B+ Tree index, wherein each pointer in the B+ Tree index specifies each of the one or more file locations for an existing data entry of the one or more entries.

12. The computer system of claim 6, further comprising program instructions, stored on the one or more computer readable storage media, which when executed by a processor, to:

store the one or more entries of the second index in the one or more file locations as a B+ Tree index, wherein each pointer in the B+ Tree index specifies each of the one or more file locations for an existing data entry of the one or more entries.

* * * * *